(12) United States Patent
Kotecha et al.

(10) Patent No.: US 10,069,950 B2
(45) Date of Patent: Sep. 4, 2018

(54) SUPPORTING NETWORK CONNECTIVITY FOR MULTIPLE CATEGORIES OF USER DEVICES AND APPLICATIONS

(71) Applicant: Verizon Patent and Licensing Inc., Arlington, VA (US)

(72) Inventors: Lalit R. Kotecha, San Ramon, CA (US); Sagiv Draznin, Walnut Creek, CA (US); Sudhakar Reddy Patil, Flower Mound, TX (US); Matthew W. Nelson, Pleasanton, CA (US); Brian Olson, Clayton, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 332 days.

(21) Appl. No.: 14/987,422

(22) Filed: Jan. 4, 2016

(65) Prior Publication Data
US 2017/0195868 A1 Jul. 6, 2017

(51) Int. Cl.
H04W 8/04 (2009.01)
H04L 29/08 (2006.01)
H04W 60/00 (2009.01)
H04L 29/12 (2006.01)
H04W 76/10 (2018.01)
(Continued)

(52) U.S. Cl.
CPC ........ *H04L 69/326* (2013.01); *H04L 61/2007* (2013.01); *H04L 67/10* (2013.01); *H04L 67/1097* (2013.01); *H04L 67/12* (2013.01); *H04L 67/125* (2013.01); *H04L 67/2833* (2013.01); *H04W 60/00* (2013.01); *H04W 76/10* (2018.02); *H04L 61/1588* (2013.01); *H04W 8/06* (2013.01); *H04W 8/24* (2013.01)

(58) Field of Classification Search
CPC ..... H04W 8/04; H04L 61/2007; H04L 69/326
See application file for complete search history.

(56) References Cited

U.S. PATENT DOCUMENTS 9,635,705 B2 * 4/2017 Lu ......................... H04W 84/00
2009/0270099 A1 * 10/2009 Gallagher ............... H04W 8/08
455/435.1
(Continued)

OTHER PUBLICATIONS

Information Sciences Institute: University of Southern California, "Transmission Control Protocol—DARPA Internet Program—Protocol Specification," https://tools.ietf.org/html/rfc793, Sep. 1981, 90 pages.
(Continued)

*Primary Examiner* — Wei Zhao

(57) ABSTRACT

A mobility management entity device (MME) may receive a request from a user device to attach to a network. The request to attach to the network may include a user device identifier for the user device. The MME may receive, from a home subscriber server (HSS) and based on the user device identifier for the user device, information relating to the user device. The information may include at least one connection parameter. The at least one connection parameter may include at least information indicating whether a bearer should be allocated to the user device. The MME may establish a network connection for the user device based on the at least one connection parameter. The MME may cause traffic to be routed from the user device based on the at least one connection parameter.

20 Claims, 7 Drawing Sheets

(51) Int. Cl.
   *H04W 8/06* (2009.01)
   *H04W 8/24* (2009.01)

(56) References Cited

U.S. PATENT DOCUMENTS

2015/0049606 A1    2/2015  So et al.
2015/0085784 A1*   3/2015  Yu .................... H04W 16/14
                                                   370/329
2015/0296499 A1   10/2015  Huang et al.

OTHER PUBLICATIONS

Braden, "Requirements for Internet Hosts—Communication Layers," https://tools.ietf.org/html/rfc1122, Oct. 1989, 116 pages.
Wikipedia, "System Architecture Evolution," https://en.wikipedia.org/wiki/System_Architecture_Evolution, Dec. 10, 2015, 8 pages.

* cited by examiner

SUPPORTING NETWORK CONNECTIVITY FOR MULTIPLE CATEGORIES OF USER DEVICES AND APPLICATIONS

BACKGROUND

Networks, including wireless networks, may be used for communications by various user devices, including machine-to-machine (M2M) and/or "Internet of Things" (IoT) devices.

DETAILED DESCRIPTION OF PREFERRED EMBODIMENTS

The following detailed description of example implementations refers to the accompanying drawings. The same reference numbers in different drawings may identify the same or similar elements.

Various user devices (e.g., M2M devices, IoT devices, mobile devices, etc.) may have varying communication needs when using wireless networks for communications. For example, some user devices might only require short message service (SMS) messaging over non-access stratum (NAS) (SMS over NAS) services, while other user devices might require one or more data bearers. Implementations described herein may support providing network connectivity, for multiple categories of user devices, based on the communication needs of the multiple categories of user devices.

Although generally described in the context of user devices, the implementations described herein may also be applicable to applications (e.g., apps) that are on or associated with user devices. For example, the applications on or associated with a user device may cause the user device to have varying communication needs when using wireless networks for communications. Thus, references herein to user devices, or the varying communications needs thereof, should be understood as additionally, or alternatively, referring to applications, or the varying communications needs of such applications, that are on or associated with such user devices.

Figure 1A:
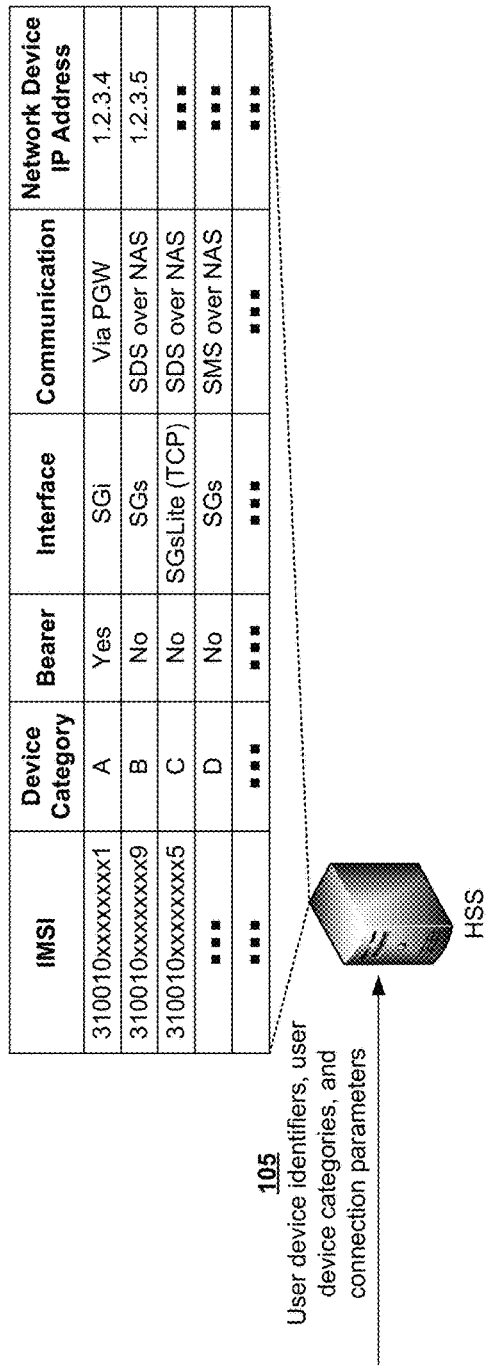
FIGS. 1A-1C are diagrams of an overview of an example implementation described herein.
Figure 1B:
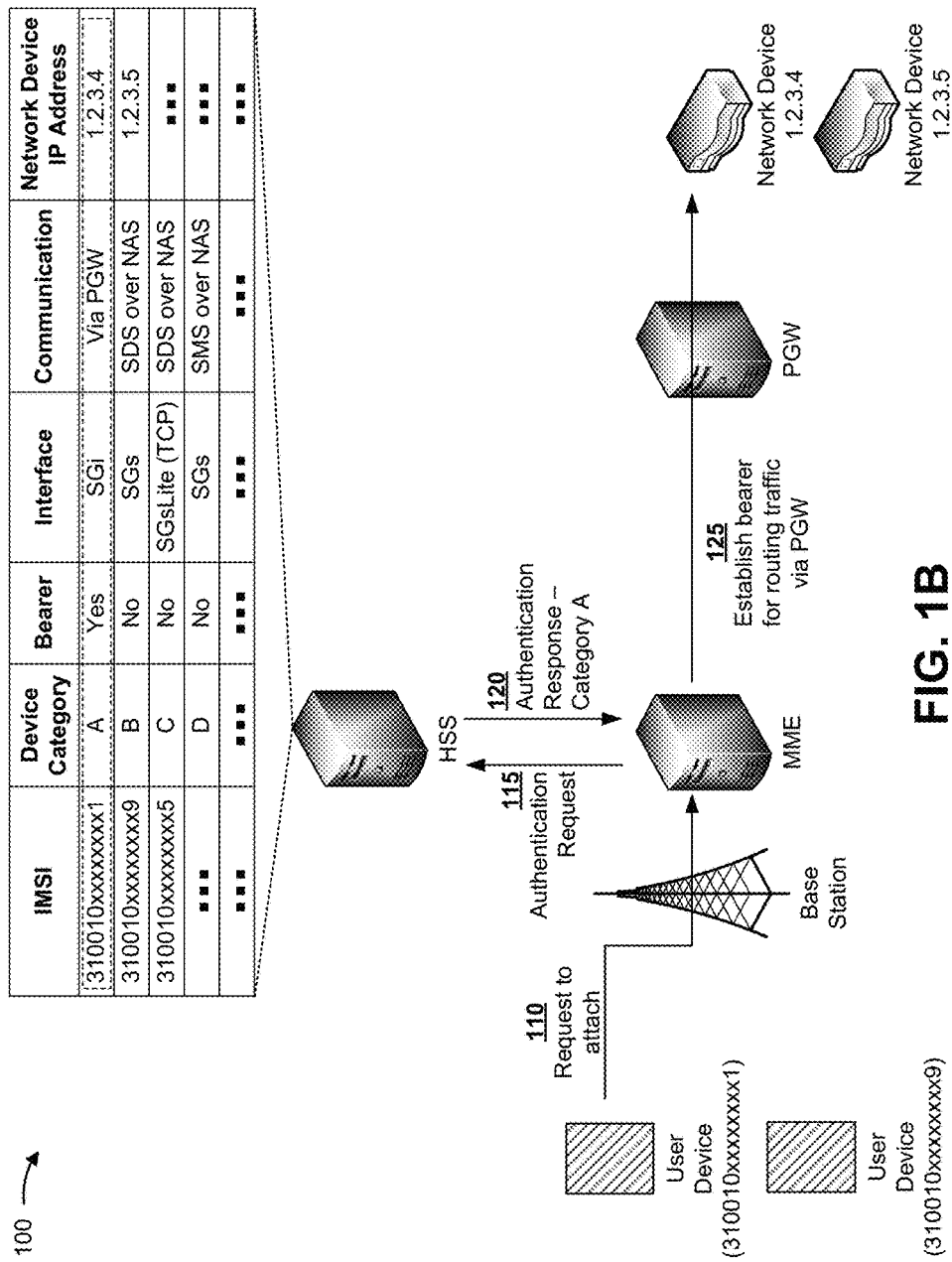
Figure 1C:
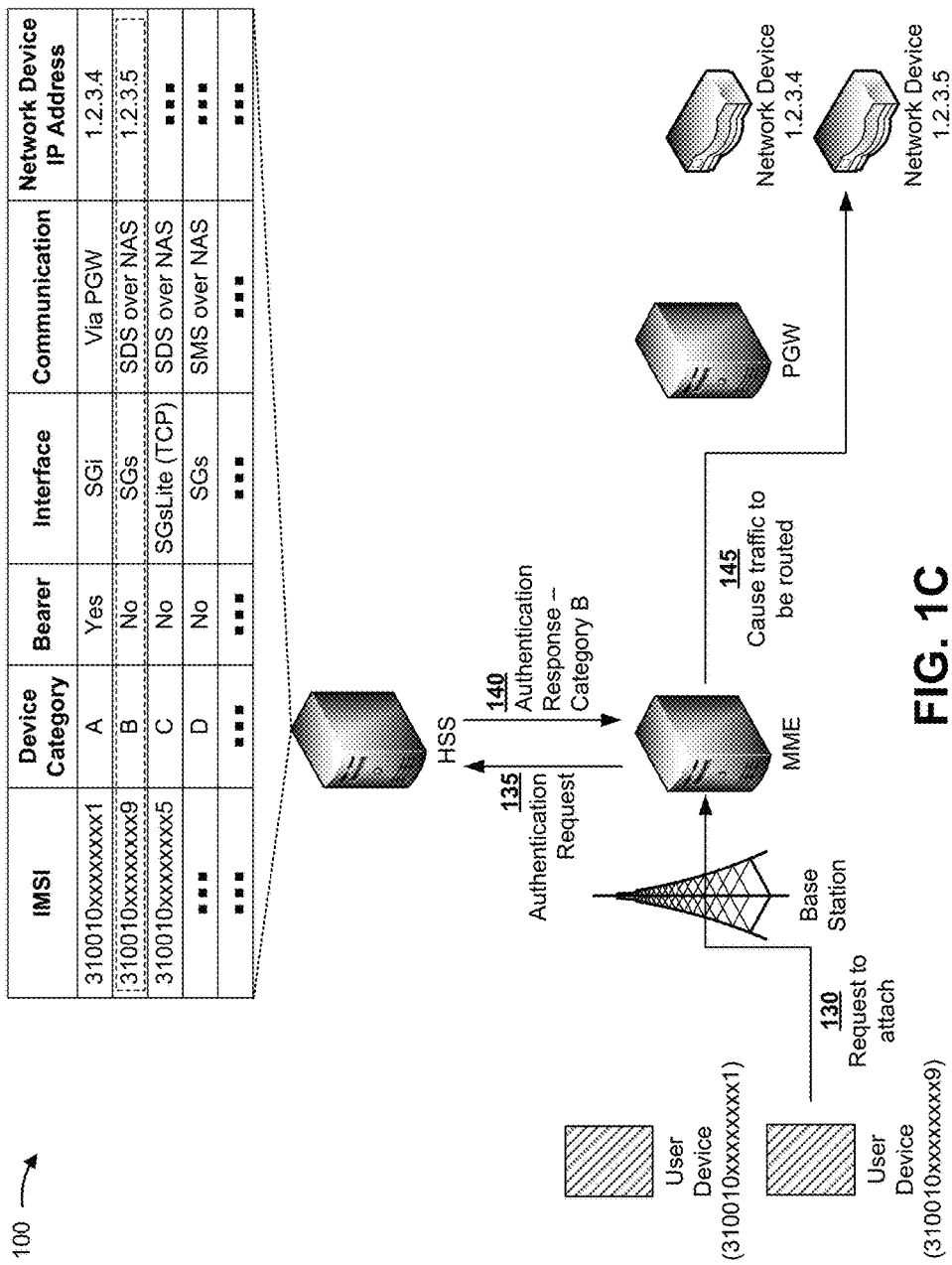

FIGS. 1A-1C are diagrams of an overview of an example implementation 100 described herein. As shown in FIG. 1A, assume that a network operator desires to provision a home subscriber server (HSS) with connection parameters for various categories of user devices based on the communication needs of the multiple categories of the user devices.

The HSS may be provisioned with information for various user devices. For example, as shown by reference number 105, HSS may receive and store information related to various devices, including user device identifiers, user device categories, and connection parameters. The information, which may be stored on the HSS based on each user device's international mobile subscriber identity (IMSI), may include user device categories (e.g., A, B, C, D, etc.) and various connection parameters (e.g., Bearer, Interface, Communication, and Network Device Internet protocol (IP) address, etc.) for the user devices and/or the user device categories. For example, the table in FIG. 1A indicates that the user device identified by IMSI 310010xxxxxxxx1 is a category "A" device, which requires a bearer, and will use the SGi interface to communicate, via a packet data network gateway (PGW), with a network device having an IP address of 1.2.3.4. As a further example, the table in FIG. 1A indicates that the user device identified by IMSI 310010xxxxxxxx9 is a category "B" device, which does not require a bearer, and will use the SGs interface to communicate via short data service (SDS) messaging over NAS, over an air interface, with a network device having an IP address of 1.2.3.5. As another example, the table in FIG. 1A indicates that the user device identified by IMSI 310010xxxxxxxx5 is a category "C" device, which does not require a bearer, and will use an "SGsLite" interface to communicate via SDS over NAS with transmission control protocol (TCP).

As shown in FIG. 1B, and by reference number 110, the user device identified by IMSI 310010xxxxxxxx1 may send, to a mobility management entity device (MME), via a base station, a request to attach to a network. In some implementations, the request to attach to the network may include the user device's IMSI. As shown by reference number 115, upon receiving the request to attach to the network, the MME may send, to the HSS, an authentication request that includes the user device's IMSI. Upon receiving the authentication request, the HSS may determine that the HSS has been provisioned with information for the user device identified by IMSI 310010xxxxxxxx1. As shown by reference number 120, the HSS may send, to the MME, an authentication response indicating that the user device belongs to category "A." In some implementations, the HSS may additionally, or alternatively, send connection parameters (e.g., Bearer: Yes, Interface: SGi, Communication: Via PGW, Network Device IP: 1.2.3.4). Based on receiving the authentication response, the MME may, as shown by reference number 125, establish a bearer for routing traffic, via the PGW, to the network device having an IP address of 1.2.3.4.

As shown in FIG. 1C, and by reference number 130, the user device identified by IMSI 310010xxxxxxxx9 may send, to the MME, via the base station, a request to attach to a network. As shown by reference number 135, upon receiving the request to attach to the network, the MME may send, to the HSS, an authentication request that includes the user device's IMSI. Upon receiving the authentication request, the HSS may determine that the HSS has been provisioned with information for the user device identified by IMSI 310010xxxxxxxx9. As shown by reference number 140, the HSS may send, to the MME, an authentication response indicating that the user device belongs to category "B." In some implementations, the HSS may additionally, or alternatively, send connection parameters (e.g., Bearer: No, Interface: SGs, Communication: SDS over NAS, Network Device IP: 1.2.3.5). Based on receiving the authentication response, the MME may, as shown by reference number 145, cause traffic to be routed to the network device having an IP address of 1.2.3.5.

In this way, the MME may provide various user devices or user device categories with different network connectivity based on the communication needs of the user devices or the communication needs defined for the user device categories. Providing various user devices or user device categories with different network connectivity, based on communication needs, may more closely align the allocated communications resources with a user device's actual communication needs. Thus, implementations described herein may reduce network communication resources consumed by user devices that might require only limited communication resources based on the type of communication used by such user devices (e.g., only SMS over NAS).

As indicated above, FIGS. 1A-1C are provided merely as an example. Other examples are possible and may differ from what was described with regard to FIGS. 1A-1C.

Figure 2:
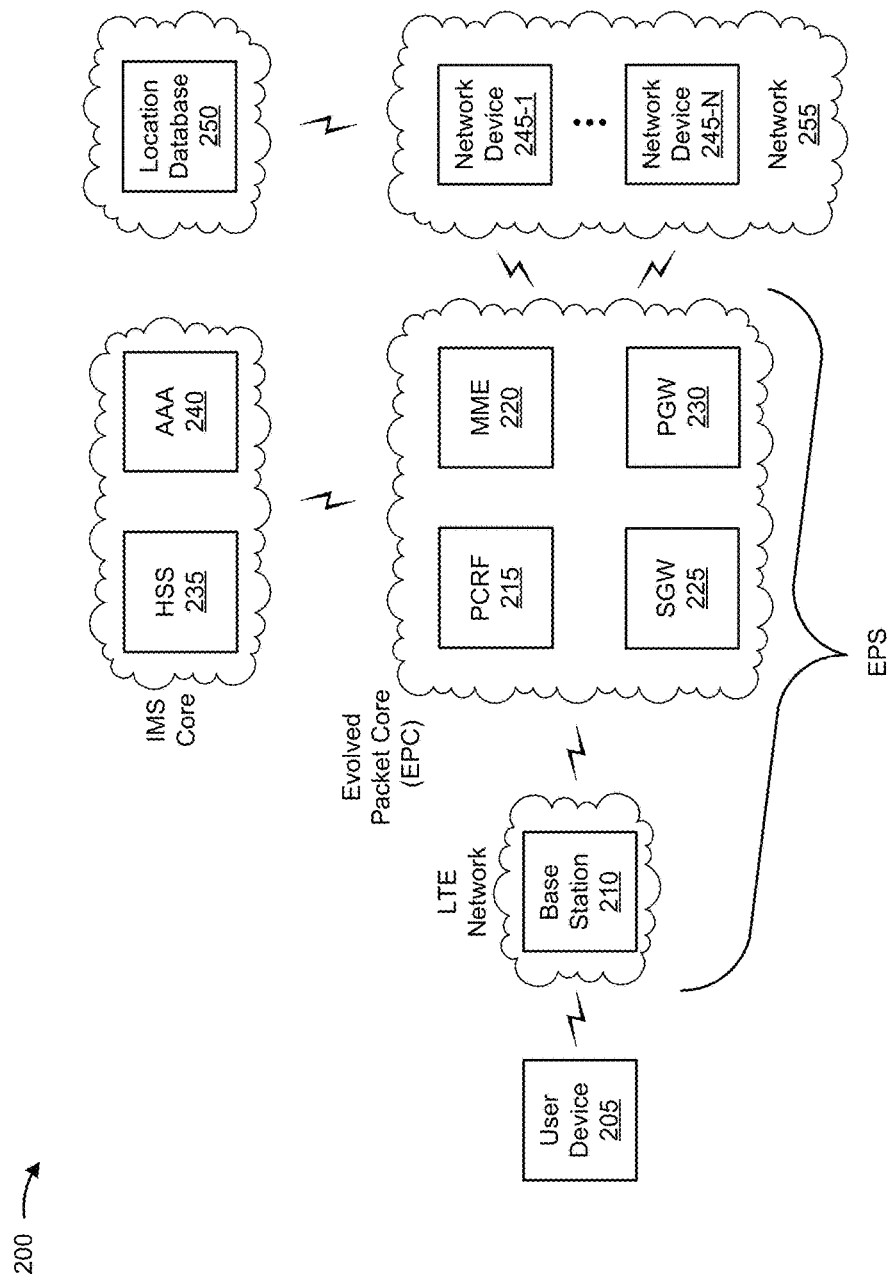
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205; a base station 210; a policy and charging rules function server (PCRF) 215; a mobility management entity device (MME) 220; a serving gateway (SGW) 225; a packet data network gateway (PGW) 230; a home subscriber server (HSS) 235; an authentication, authorization, and accounting server (AAA) 240; one or more network devices 245-1 through 245-N (N≥1) (hereinafter referred to collectively as "network devices 245," and individually as "network device 245"); a location database 250; and a network 255. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a code division multiple access (CDMA) network, or another type of network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user device 205 communicates with the EPC. The EPC may include PCRF 215, MME 220, SGW 225, and/or PGW 230 that enable user device 205 to communicate with network devices 245, network 255, and/or an Internet protocol (IP) multimedia subsystem (IMS) core. The IMS core may include HSS 235 and/or AAA 240, and may manage device registration and authentication, session initiation, etc., associated with user devices 205. HSS 235 and/or AAA 240 may reside in the EPC and/or the IMS core.

User device 205 may include one or more devices capable of communicating with base station 210 and/or a network (e.g., network 255). For example, user device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a pair of smart eyeglasses, a smart watch, etc.), a machine device, a machine-to-machine (M2M) device, an "Internet of Things" (IoT) device, and/or a similar device. User device 205 may send traffic to and/or receive traffic from network 255 (e.g., via base station 210, SGW 225, and/or PGW 230).

Base station 210 may include one or more devices capable of transferring traffic, such as audio, video, text, and/or other traffic, destined for and/or received from user device 205. In some implementations, base station 210 may include an eNB associated with the LTE network that receives traffic from and/or sends traffic to network 255 via SGW 225 and/or PGW 230. Additionally, or alternatively, one or more base stations 210 may be associated with a radio access network that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

PCRF 215 may include one or more server devices, or other types of computation, network, and/or communication devices. PCRF 215 may store subscriber information, such as voice call and data rate plans or quotas for subscribers. PCRF 215 may provide network control regarding service data flow detection, gating, quality of service (QoS), QoS class identifier (QCI) and/or flow-based charging. Policies and rules regarding QoS and/or QCI may include policies and rules instructing user device 205 and/or network elements (base station 210, MME 220, SGW 225, PGW 230, etc.) to minimize packet loss, to implement a packet delay budget, to provide a guaranteed bit rate (GBR), to provide a particular latency, to reduce RF signal congestion, and/or to perform other activities associated with QoS and/or a QCI. PCRF 215 may provide policies and rules to other network devices, such as base station 210, SGW 225, PGW 230, or the like, to implement network control. PCRF 215 may determine how a certain service data flow shall be treated, and may ensure that user plane traffic mapping and QoS is in accordance with a user's profile and/or network policies. PCRF 215 may assign, to a network resource (e.g., a bearer) requested by and/or assigned to user device 205, one or more QoS parameters based on a subscriber class associated with, and/or a service type requested by, user device 205.

MME 220 may include one or more devices, such as one or more server devices, capable of managing authentication, activation, deactivation, and/or mobility functions associated with user device 205. In some implementations, MME 220 may perform operations relating to authentication of user device 205. Additionally, or alternatively, MME 220 may facilitate the selection of a particular SGW 225 and/or a particular PGW 230 to serve traffic to and/or from user device 205. MME 220 may perform operations associated with handing off user device 205 from a first base station 210 to a second base station 210 when user device 205 is transitioning from a first cell associated with the first base station 210 to a second cell associated with the second base station 210. Additionally, or alternatively, MME 220 may select another MME (not pictured), to which user device 205 should be handed off (e.g., when user device 205 moves out of range of MME 220). In some implementations, MME 220 may be connected to base station 210 (e.g., when base station 210 is an eNB) using an S1-MME interface. In some implementations, MME 220 may be connected to HSS 235 using an S6a interface. For example, MME 220 may be connected to HSS 235 using an S6a stream control transmission protocol (SCTP)/diameter interface that may be transported over SCTP/IP. In some implementations, MME 220 may be connected to network devices 245 via one or more transmission control protocol (TCP)/IP (TCP/IP) sessions.

SGW 225 may include one or more devices capable of routing packets. For example, SGW 225 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 225 may aggregate traffic received from one or more base stations 210 associated with the LTE network, and may send the aggregated traffic to network 255 (e.g., via PGW 230) and/or other network devices associated with the EPC and/or the IMS core. SGW 225 may also receive traffic from network 255 and/or other network devices, and may send the received traffic to user device 205 via base station 210. Additionally, or alternatively, SGW 225 may perform operations associated with handing off user device 205 to and/or from an LTE network.

PGW 230 may include one or more devices capable of providing connectivity for user device 205 to external packet data networks (e.g., other than the depicted EPC and/or LTE network). For example, PGW 230 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 230 may aggregate traffic received from one or more SGWs 225, and may send the aggregated traffic to network 255 (e.g., to network devices 245). Additionally, or alternatively, PGW 230 may receive traffic from network 255 (e.g., from network devices 245), and may send the traffic to user device 205 via SGW 225 and base station 210. PGW 230 may record data usage information (e.g., byte usage), and may provide the data usage information to AAA 240.

HSS 235 may include one or more devices, such as one or more server devices, capable of managing (e.g., receiving, generating, storing, processing, and/or providing) information associated with user device 205. For example, HSS 235 may manage subscription information associated with user device 205, such as information that identifies a subscriber profile of a user associated with user device 205, information that identifies services and/or applications that are accessible to user device 205, location information associated with user device 205, a user device identifier that identifies user device 205 (e.g., a network identifier, a network address, an international mobile subscriber identity (IMSI), a temporary mobile subscriber identity (TMSI), and/or another item of information that may be sufficient to identify user device 205), information that identifies a treatment of user device 205 (e.g., quality of service information, a quantity of minutes allowed per time period, a quantity of data consumption allowed per time period, a user device category, connection parameters associated with the user device and/or the user device category, etc.), and/or similar information. HSS 235 may provide this information to one or more other devices (e.g., MME 220) of environment 200 to support the operations performed by those devices.

AAA 240 may include one or more devices, such as one or more server devices, that perform authentication, authorization, and/or accounting operations for communication sessions associated with user device 205. For example, AAA 240 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, etc.), may track resources consumed by user device 205 (e.g., a quantity of voice minutes consumed, a quantity of data consumed, etc.), and/or may perform similar operations.

Network device 245 may include one or more devices (e.g., one or more traffic transfer devices) capable of processing and/or transferring traffic between user device 205, base station 210, PCRF 215, MME 220, SGW 225, PGW 230, HSS 235, AAA 240, another network device 245, location database 250, and/or the remainder of network 255. For example, network device 245 may include a firewall, a router, a gateway, a switch, a hub, a bridge, a reverse proxy, a server (e.g., a proxy server), a security device, an intrusion detection device, a load balancer, or a similar device. In some implementations, network device 245 may be, or may be a part of, an IoT gateway (IoT GW) through which one or more IoT devices (e.g., some examples of user device 205) may connect to a network, such as network 255.

Location database 250 may include one or more devices, such as one or more server or storage devices, which may store location information with regard to user device 205, MME 220, and/or network device 245. In some implementations, information regarding user device 205 (e.g., location information for user device 205, identification of a serving MME for user device 205 (e.g., MME 220), identification of a destination network device for user device 205 (e.g., network device 245) from and/or to which user device 205 may send and/or receive traffic, etc.) may be periodically received by location database 250 (e.g., from network device 245). In some implementations, location database 250 may receive the information regarding user device 205 from a serving MME for user device 205 over a suitable interface (e.g., an SGs interface or the SGsLite interface described below).

Network 255 may include one or more wired and/or wireless networks. For example, network 255 may include a cellular network (e.g., an LTE network, a 3G network, a CDMA network, etc.), a public land user network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
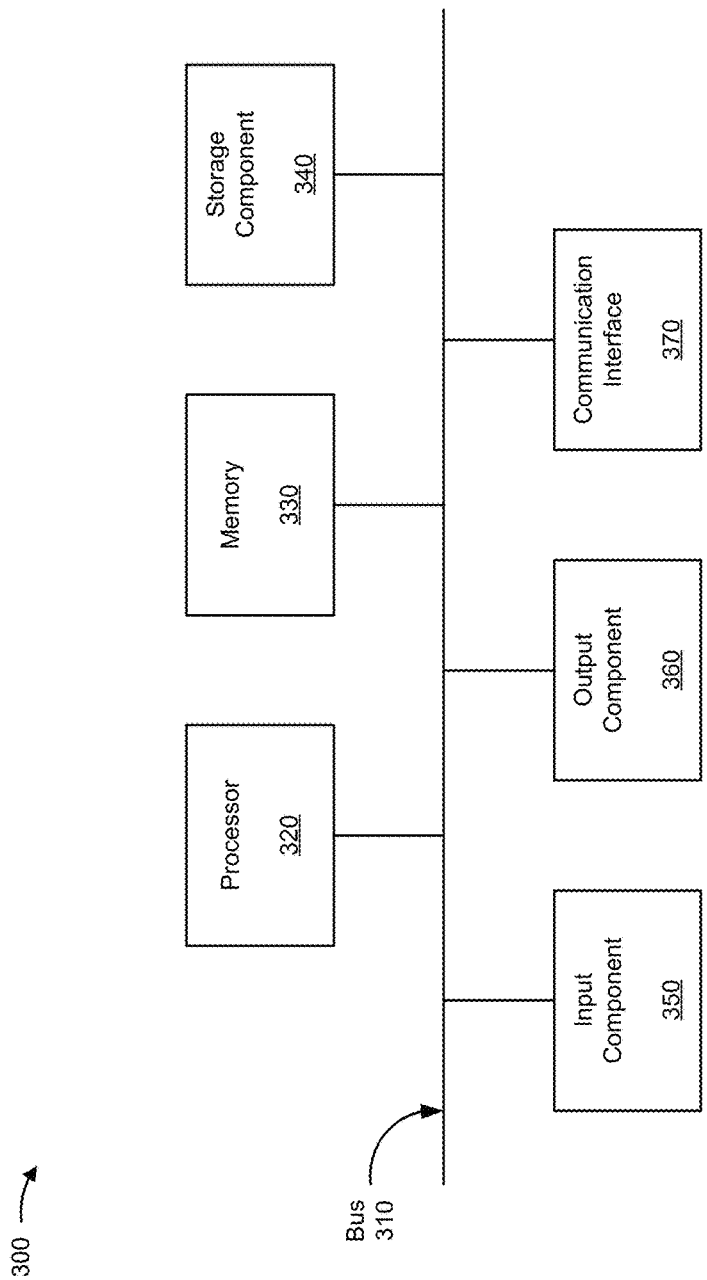
FIG. 3 is a diagram of example components of one or more devices of FIG. 2.

FIG. 3 is a diagram of example components of a device 300. Device 300 may correspond to user device 205, base station 210, PCRF 215, MME 220, SGW 225, PGW 230, HSS 235, AAA 240, network device 245, and/or location database 250. In some implementations, user device 205, base station 210, PCRF 215, MME 220, SGW 225, PGW 230, HSS 235, AAA 240, network device 245, and/or location database 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
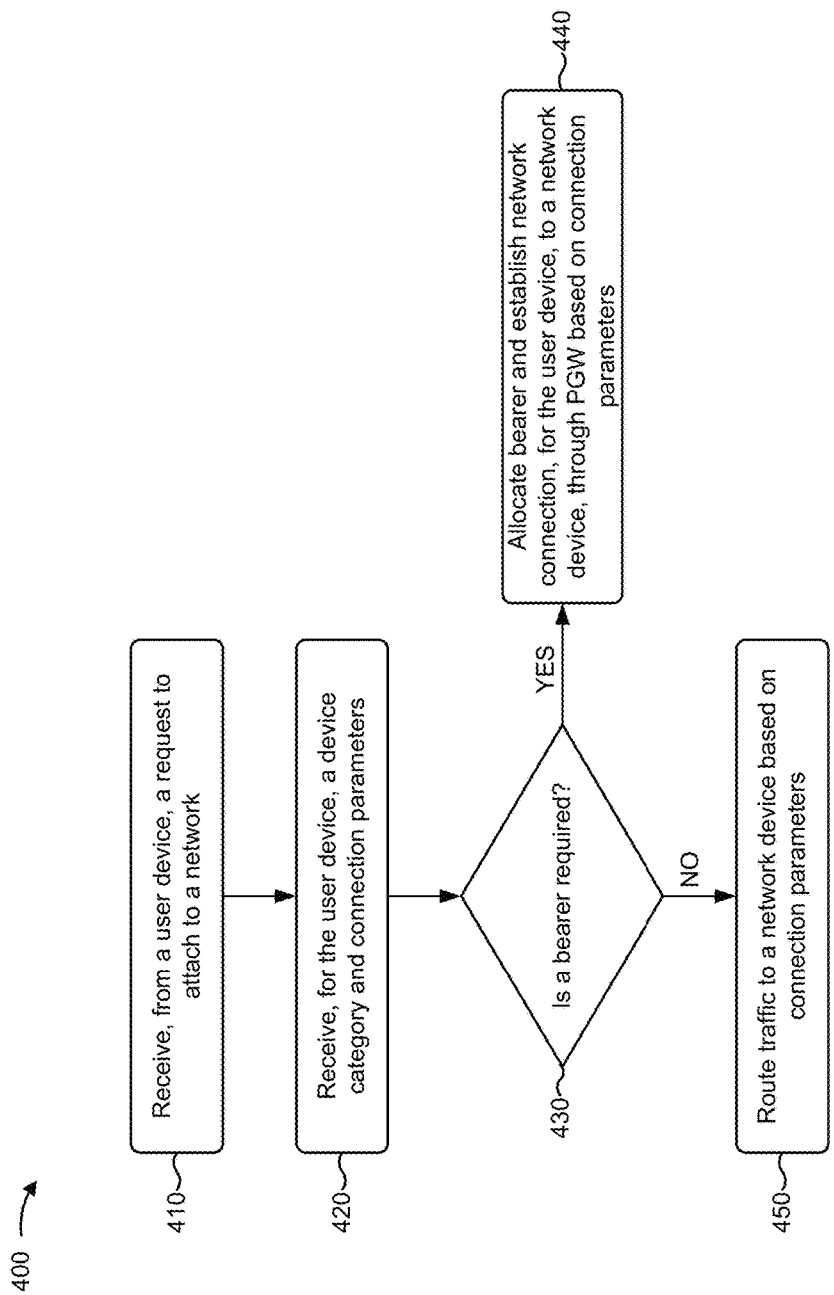
FIG. 4 is a flow chart of an example process for supporting network connectivity for multiple categories of user devices and applications.

FIG. 4 is a flow chart of an example process 400 for supporting network connectivity for multiple categories of user devices and applications (e.g., applications on and/or associated with user devices). In some implementations, one or more process blocks of FIG. 4 may be performed by MME 220. In some implementations, one or more process blocks of FIG. 4 may be performed by another device or a group of devices separate from or including MME 220, such as user device 205, base station 210, PCRF 215, SGW 225, PGW 230, HSS 235, AAA 240, network device 245, and/or location database 250.

As shown in FIG. 4, process 400 may include receiving, from a user device, a request to attach to a network (block 410). For example, MME 220 may receive, from user device 205 (e.g., through base station 210), a request to attach to the LTE network or to network 255. In some implementations, the request to attach to the network may include a user device identifier (e.g., network identifier, network address, IMSI, TMSI, etc.) that may uniquely identify the user device.

As further shown in FIG. 4, process 400 may include receiving, for the user device, a device category and connection parameters (block 420). For example, MME 220 may receive, from HSS 235, a device category and/or connection parameters for user device 205. In some implementations, the device category received from HSS 235 may be determinative as to the connection parameters to be used for user devices within the device category (e.g., user device 205).

In some implementations, HSS 235 may receive and store information relating to user devices, including user device identifiers, user device categories, and/or connection parameters. In some implementations, the information relating to user devices may be stored in a user device database stored in HSS 235. In some implementations, HSS 235 may receive the information relating to a user device (e.g., user device 205) when the user device registers or attaches to the network, such as when the user device first registers or attaches to the network. For example, HSS 235 may receive and store information relating to user device 205 when user device 205 registers or attaches to the network (e.g., through base station 210).

In some implementations, user devices may be grouped into user device categories, which may be based on one or more of the connection parameters associated with the user devices. For example, HSS 235 may group user device 205 into a particular user device category based on how traffic is to be routed for user device 205.

In some implementations, the connection parameters may include information that MME 220 may use to establish a network connection and/or cause traffic to be routed for user device 205. For example, when the device category received from HSS 235 is not determinative as to the connection parameters to be used for user devices within a device category, the connection parameters may include information regarding whether to allocate a bearer, interface type, traffic routing, network device IP address, QoS, QCI, etc.

In some implementations, the connection parameters may specify whether to allocate a bearer to user devices associated with a particular user device category. For example, some categories of user device may use one or more bearers, while other categories of user device may have traffic routed over the control channel, without needing to have a bearer allocated or needing to set up or establish a connection through SGW 225 and PGW 230. In some implementations, the connection parameters may specify a number of bearers (e.g., one bearer or multiple bearers) and/or a bearer type and/or characteristic (e.g., data, voice, default, dedicated, data rate, connection frequency, etc.). For example, the connection parameters may specify that some user devices (e.g., a mobile phone) should have two bearers allocated: one for data connections and one for voice communications.

In some implementations, the connection parameters may specify an interface and/or interface type to be used by user devices associated with the user device category. For example, the connection parameters may specify using an SGi interface between PGW 230 and network device 245, an SGs interface between MME 220 and network device 245, a modified SGs interface (described below) between MME 220 and network device 245, etc.

In some implementations, the connection parameters may specify a traffic routing to be used by user devices associated with the user device category. For example, the connection parameters may specify routing traffic via: the PGW (e.g., using the SGi interface when bearers have been allocated), SMS over NAS (e.g., using the SGs interface), short data service (SDS) messaging over an air interface (e.g., using the SGs interface), or SDS with TCP (e.g., using a modified SGs interface, as described below).

In some implementations, the connection parameters may specify a network device IP address to be used by user devices associated with the user device category. For example, the connection parameters may include the IP address of network device 245 to specify that traffic from and/or to user device 205 may be routed to and/or from network device 245.

In some implementations, one or more device platforms (e.g., IoT device platforms) may provision HSS 235 with user devices associated with the device platforms. For example, a device platform may provide to HSS 235, and HSS 235 may store, a device category for the device platform, user device identifiers for user devices associated with the device platform (e.g., user devices associated with the device platform and within the device category), associated connection parameters for the device platform, and/or which network device 245 is used by or for the device platform. In some implementations, where the device platform is an IoT device platform, the device platform may provision HSS 235 with an IoT gateway (IOT GW) (e.g., a particular and/or appropriate network device 245) to service traffic to and/or from user device 205.

In some implementations, when user device 205 requests to attach or attaches to the wireless network (e.g., through base station 210), MME 220 may send, to HSS 235 (e.g., over the S6a interface between MME 220 and HSS 235), an authentication request to obtain the user device category and/or connection parameters for user device 205. In some implementations, the authentication request may include, for user device 205, a user device identifier (e.g., an IMSI, a TMSI, or another item of information that may be sufficient to identify user device 205).

In some implementations, where information relating to user device 205 has been stored by HSS 235, MME 220 may receive, from HSS 235, in response to the authentication request, a positive authentication response. For example, when HSS 235 has stored the user device identifier (e.g., network identifier, network address, IMSI, TMSI, etc.) for user device 205, HSS 235 may associate, in HSS 235, the user device identifier for user device 205 with a user device category or connection parameters for user device 205. In some implementations, the positive authentication response may include the user device category and/or the connection parameters that HSS 235 has associated with the user device identifier for user device 205, such that MME 220 may cause user device 205 to be attached to the network.

Based on the positive authentication response, MME 220 may cause traffic to be routed for user device 205 based on the user device category or connection parameters received from HSS 235. For example, MME 220 may cause traffic to be routed from user device 205 to an appropriate network device 245, based on the user device category or connection parameters received from HSS 235. Additionally, or alternatively, MME 220 may cause traffic to be routed to user device 205 from an appropriate network device 245, based on the user device category or connection parameters received from HSS 235.

As further shown in FIG. 4, process 400 may include determining whether a bearer is required (block 430). For example, the device category, received from HSS 235, may be used to determine whether a bearer is required or, when the device category is not determinative as to whether a bearer is required, the connection parameters, received from HSS 235, may specify whether a bearer is required.

As further shown in FIG. 4, if a bearer is required (block 430—YES), process 400 may include allocating the bearer and establishing a network connection, for the user device, to a network device, through PGW based on connection parameters (block 440). For example, if the user device category or connection parameters for user device 205 indicate that a bearer should be allocated, MME 220 may allocate one or more bearers and establish a network connection, for user device 205, to an appropriate network device 245, through PGW 230 (e.g., using the SGi interface), based on the user device category or connection parameters.

As further shown in FIG. 4, if a bearer is not required (block 430—NO), process 400 may include routing traffic to a network device based on connection parameters (block 450). For example, if the user device category or connection parameters for user device 205 indicate that no bearer is needed, MME 220 may establish a suitable network connection, for user device 205, and cause traffic to be routed (e.g., over a control channel) to and/or from an appropriate network device 245. In some implementations, establishing a suitable network connection may include providing a suitable communication interface (e.g., a communication interface specified in the connection parameters). For example, MME 220 may provide an SGs interface and cause traffic to be routed via SMS over NAS over an air interface. In some implementations, MME 220 may provide an SGs interface and cause traffic to be routed via SDS messaging over an air interface.

In some implementations, MME 220 may cause traffic, including SMS message traffic, to be routed (e.g., between user device 205 and network device 245) using SDS messages with TCP, using a modified SGs interface, which may be referred to as an "SGsLite" interface. In some implementations, the SGsLite interface may be an application layer protocol that may be transported, without allocating a bearer, over one or more TCP/IP sessions between MME 220 and network device 245.

In some implementations, MME 220 may determine that user device 205 may support SDS messages based on information in a subscriber profile, for user device 205, that may be obtained from HSS 235 (e.g., over the S6a interface) when user device 205 attaches to the network. User device may have attached to the network by exchanging standard NAS messages with an MME (e.g., MME 220) selected by the serving base station (e.g., base station 210, which may be an eNB) to perform attachment, service requests, detachment, tracking area updates, authorization, etc. In some implementations, network device 245 may receive (e.g., from a serving MME for a user device) location information for the user device (e.g., the identity of the serving MME for each user device) and may update location database 250 with the location information.

In the SGsLite interface, a downlink unidata message that encapsulates an SDS message may be sent, from network device 245, to MME 220, which may trigger MME 220 to page user device 205 (e.g., without an explicit paging request from network device 245, to MME 220, for user device 205 (e.g., network device 245 may be operating in a store-and-forward mode)). In some implementations, MME 220 may page user device 205, based on MME 220 receiving a message, based on information regarding user device 205 received, by MME 220, from location database 250. If the paging of user device 205 succeeds, the SDS message may be delivered over NAS from MME 220 to user device 205. If the paging of user device 205 fails, an error with a cause may be returned to network device 245. In some implementations, network device 245 may select (e.g., based on information in the location database 250) which MME (e.g., MME 225) may deliver the message to a given user device (e.g., user device 205).

In some implementations, the SGsLite interface may be used without any hard anchoring between user device 205, MME 220, and/or one of the network devices 245. For example, the SGsLite interface may use the ability of MME 220 to page user device 205 and to retrieve information (e.g., from location database 250) to determine how MME 220 may contact user device 205 and/or of the network devices 245.

In some implementations, the information stored in location database 250 may allow any of the network devices 245 to determine a serving MME for user device 205 (e.g., without needing a hard anchor or client-server relationship between user device 205 and one of the network devices 245). For example, any of network devices 245 may obtain, from location database 250, location information for user device 205 and/or identification of the serving MME for user device 205. In some implementations, network device 245 may determine a serving MME for user device 205 (e.g., MME 220) based on information in location database 250, such that the serving MME (e.g., MME 220) may accept messages, for user device 205, from any network device 245 to which the serving MME (e.g., MME 220) is connected, regardless of whether the serving MME (e.g., MME 220) has previously sent messages (e.g., from user device 205) to the network device 245.

In some implementations, the information stored in location database 250 may allow MME 220 to determine a destination network device for user device 205 (e.g., without needing a hard anchor or client-server relationship between user device 205 and one of the network devices 245). For example, MME 220 may obtain, from location database 250, location information for user device 205 and/or identification of a network device 245 from and/or to which user device 205 may send and/or receive traffic. In some implementations, MME 220 may determine a destination network device (e.g., a destination network gateway, such as network device 245-1) for user device 205 based on information in location database 250, such that the destination network device (e.g., network device 245-1) may accept messages, for user device 205, from any MME (e.g., MME 220) to which the destination network device (e.g., network device 245-1) is connected, regardless of whether the MME (e.g., MME 220) has sent a location update to the destination network device (e.g., network device 245-1).

In some implementations, network device 245 may generate message identifiers (IDs) for SDS messages being packed or sent, and the message IDs may be reflected in responses to the messages. The SDS message IDs may be used to obtain and/or correlate responses to messages that network device 245 has packed or sent. In some implementations, the SDS message IDs may be used to obtain and/or correlate acknowledgement characters (ACKs) for packed or sent messages.

Using SDS messages rather than SMS messages may reduce the number of messages being sent because SDS messages may be larger than SMS messages (e.g., about 250 characters for SMS messages, as opposed to about 140 characters for SMS messages). Reducing the number of messages being sent may reduce the number of acknowledgements sent and/or received, which may conserve user device battery life as the user device may more quickly and more efficiently complete transmission, delivery, or reception of the messages, such that the user device may more quickly return to standby mode. Additionally, using TCP as a transport layer for the SDS messages, as opposed to the SCTP streaming protocol that might be used with SMS messages, may provide a more reliable transport layer between MME 220 and network device 245 (e.g., due to the use of ACKs and negative acknowledgement characters (NACKs) in TCP). Additionally, or alternatively, using TCP may be more efficient than using the streaming protocol of SCTP.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
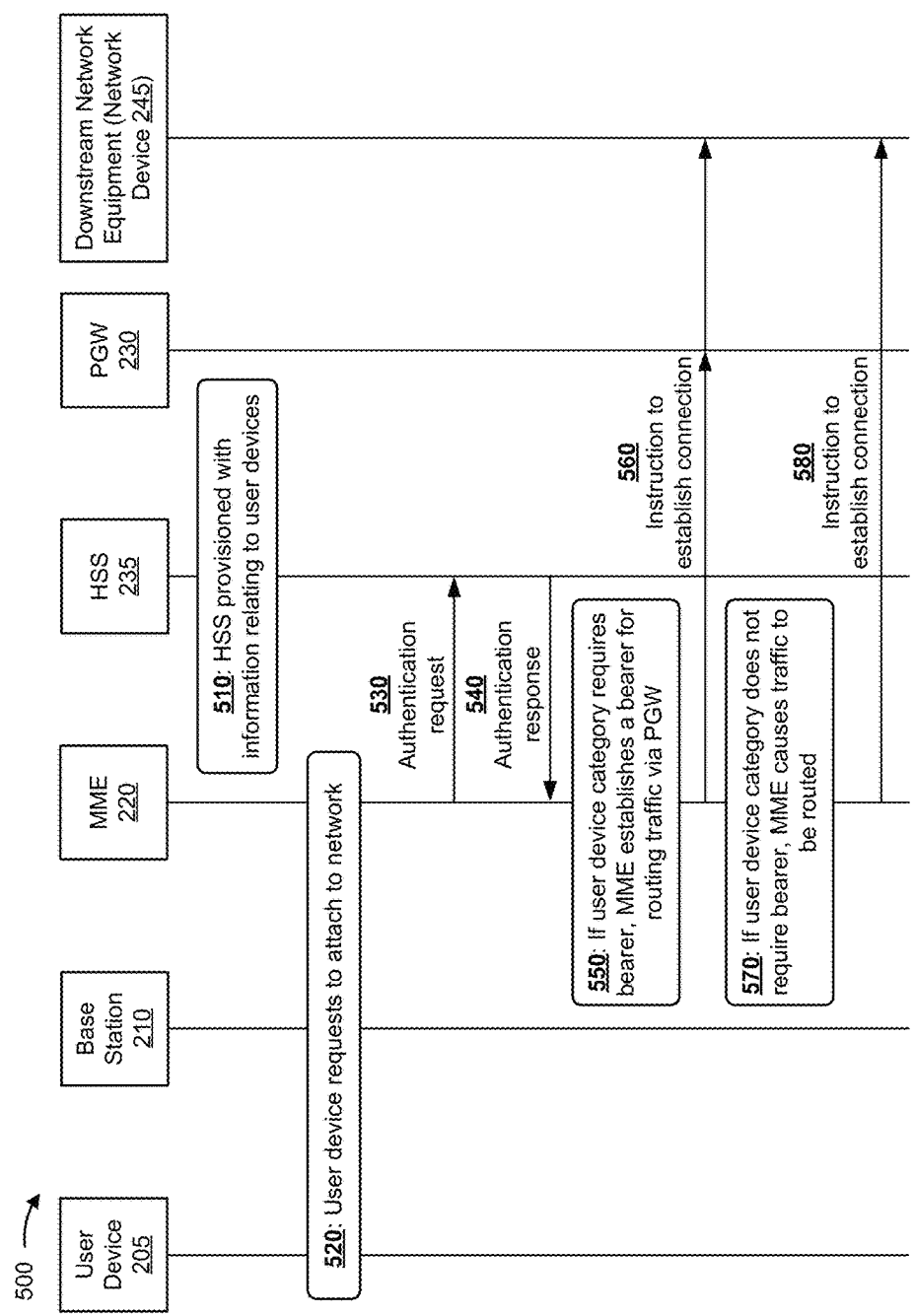
FIG. 5 is a call flow diagram of an example call flow for supporting network connectivity for multiple categories of user devices and applications.

FIG. 5 is a call flow diagram of an example call flow 500 for supporting network connectivity for multiple categories of user devices and applications. FIG. 5 shows an example of a user device requesting to attach to the network, and having a network connection established, either with a bearer via the PGW to the downstream network equipment (e.g., if a user device category for the user device requires a bearer) or to the downstream network equipment without a bearer (e.g., if the user device category does not require a bearer).

As shown in FIG. 5, and by reference number 510, HSS 235 may be provisioned with information relating to user devices. The information relating to user devices may include user device identifiers, user device categories and/or connection parameters. As shown by reference number 520, user device 205 may request to attach to a network.

As shown by reference number 530, MME 220 may send an authentication request to HSS 235. As shown by reference number 540, HSS 235 may return an authentication response to MME 220.

In some implementations, HSS 235 may determine, based on the authentication request, whether HSS 235 has been provisioned with device information for user device 205. If HSS 235 has stored device information for user device 205, a positive authentication response may be returned, with the positive authentication response including a user device category and/or connection parameters for user device 205. If HSS 235 does not have stored device information for user device 205, a negative authentication response may be returned, which may include an indication that HSS 235 does not have stored device information for user device 20.

As shown by reference number 550, if the user device category requires a bearer, MME 220 may establish the bearer for routing traffic, for user device 205, via PGW 230, to the downstream network equipment (e.g., network device 245). MME 220 may also send an instruction, to PGW 230 and network device 245, to establish a connection with user device 205, as shown by reference number 560.

As shown by reference number 570, if the user device category does not require a bearer, MME 220 may cause traffic to be routed, for user device 205, to the downstream network equipment (e.g., network device 245). MME 220 may also send an instruction, to network device 245, to establish a connection with user device 205, as shown by reference number 580.

As indicated above, FIG. 5 is provided merely as an example. Other examples are possible and may differ from what was described with regard to FIG. 5.

Implementations described herein may establish network connections for various categories of user devices. In some implementations, the network connections may be based on stored user device categories and/or connection parameters. Establishing network connections based on stored user device categories and/or connection parameters may allocate network resources based on the actual needs for a given connection.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A mobility management entity device (MME), comprising:
   a memory; and
   one or more processors of the MME to:
      receive, from a user device, a request to attach to a network,
         the request to attach to the network including a user device identifier;
      request, based on the user device identifier and from a home subscriber server (HSS), information relating to the user device;
      receive, from the HSS, the information relating to the user device,
         the information including:
            a device category associated with the user device, and
            at least one connection parameter,
               the at least one connection parameter including at least information indicating whether a bearer should be allocated to the user device;
      establish a network connection, for the user device, based on the at least one connection parameter,
         where the one or more processors of the MME, when establishing the network connection, for the user device, based on the at least one connection parameter, are to:
            selectively allocate the bearer, based on the information indicating whether the bearer should be allocated to the user device specifying that the bearer should be allocated, or
            selectively not allocate the bearer, based on the information indicating whether the bearer should be allocated to the user device specifying that the bearer should not be allocated; and
      cause traffic to be routed, from the user device, based on the at least one connection parameter,
         when the bearer is allocated, the traffic being routed via a packet data network gateway.

2. The MME of claim 1,
where the at least one connection parameter specifies an Internet protocol (IP) address for a network device; and
where the one or more processors of the MME, when causing the traffic to be routed, from the user device, based on the at least one connection parameter, are to:
cause the traffic to be routed, from the user device, to the network device based on the IP address for the network device.

3. The MME of claim 2,
where the at least one connection parameter specifies an SGs interface for the network connection; and
where the one or more processors of the MME, when causing the traffic to be routed, from the user device, based on the at least one connection parameter, are to:
cause the traffic to be routed, from the user device, to the network device, using the SGs interface.

4. The MME of claim 1,
where the at least one connection parameter specifies:
a communication interface to be used with the network connection,
the communication interface comprising short data service (SDS) messages sent over a transmission control protocol (TCP) transport layer; and
where the one or more processors of the MME, when establishing the network connection, for the user device, based on the at least one connection parameter, are to:
cause the network connection to use the communication interface comprising SDS messages sent over the TCP transport layer.

5. The MME of claim 1,
where the one or more processors of the MME are further to:
receive, from a location database, information indicating that traffic from the user device should be routed to a network device; and
where the one or more processors of the MME, when causing the traffic to be routed, from the user device, based on the at least one connection parameter, are to:
cause the traffic to be routed, from the user device, to the network device.

6. A non-transitory computer-readable medium storing instructions, the instructions comprising:
one or more instructions that, when executed by one or more processors of a mobility management entity device (MME), cause the one or more processors of the MME to:
receive, from a user device, a request to attach to a network,
the request to attach to the network including a user device identifier;
request, based on the user device identifier and from a home subscriber server (HSS), a device category for the user device;
receive, from the HSS, the device category for the user device,
the device category being used to identify:
at least one connection parameter including at least information indicating whether a bearer should be allocated to the user device;
establish a network connection, for the user device, based on the at least one connection parameter,
where the one or more instructions, that cause the one or more processors of the MME to establish the network connection, for the user device, based on the at least one connection parameter, cause the one or more processors of the MME to:
selectively allocate the bearer, based on the information indicating whether the bearer should be allocated to the user device specifying that the bearer should be allocated, or
selectively not allocate the bearer, based on the information indicating whether the bearer should be allocated to the user device specifying that the bearer should not be allocated; and
cause traffic to be routed, from the user device, based on the at least one connection parameter;
when the bearer is allocated, the traffic being routed via a packet data network gateway.

7. The non-transitory computer-readable medium of claim 6,
where the at least one connection parameter specifies an Internet protocol (IP) address for a network device; and
where the one or more instructions, that cause the one or more processors of the MME to cause the traffic to be routed, from the user device, based on the at least one connection parameter, cause the one or more processors of the MME to:
cause the traffic to be routed, from the user device, to the network device based on the IP address for the network device.

8. The non-transitory computer-readable medium of claim 7,
where the at least one connection parameter specifies an SGs interface to be used with the network connection; and
where the one or more instructions, that cause the one or more processors of the MME to cause the traffic to be routed, from the user device, based on the at least one connection parameter, cause the one or more processors of the MME to:
cause the traffic to be routed, from the user device, to the network device, using the SGs interface.

9. The non-transitory computer-readable medium of claim 6,
where the at least one connection parameter specifies:
a communication interface to be used with the network connection the communication interface comprising short data service (SDS) messages sent over a transmission control protocol (TCP) transport layer; and
where the one or more instructions, that cause the one or more processors of the MME to establish the network connection, for the user device, based on the at least one connection parameter, cause the one or more processors of the MME to:
cause the network connection to use the communication interface comprising SDS messages sent over the TCP transport layer.

10. The non-transitory computer-readable medium of claim 6,
where the one or more instructions, when executed by the one or more processors of the MME, further cause the one or more processors of the MME to:
receive, from a location database, information indicating that traffic from the user device should be routed to a network device; and
where the one or more instructions, that cause the one or more processors of the MME to cause the traffic to be routed, from the user device, based on the at least one connection parameter, cause the one or more processors of the MME to:

cause the traffic to be routed, from the user device, to the network device.

11. A method, comprising:
receiving, by a mobility management entity device (MME), a request from a user device to attach to a network,
the request to attach to the network including a user device identifier for the user device;
receiving, by the MME, from a home subscriber server (HSS) and based on the user device identifier for the user device, information relating to the user device,
the information including:
at least one connection parameter,
the at least one connection parameter including at least information indicating whether a bearer should be allocated to the user device;
establishing, by the MME, a network connection for the user device based on the at least one connection parameter,
establishing the network connection, comprising:
selectively allocating the bearer, based on the information indicating whether the bearer should be allocated to the user device specifying that the bearer should be allocated, or
selectively not allocating the bearer, based on the information indicating whether the bearer should be allocated to the user device specifying that the bearer should not be allocated; and
causing traffic to be routed from the user device, by the MME, based on the at least one connection parameter, when the bearer is allocated, the traffic being routed via a packet data network gateway.

12. The method of claim 11, further comprising:
requesting, by the MME, based on the user device identifier and from the HSS, the information relating to the user device.

13. The method of claim 11,
where the at least one connection parameter specifies:
an SGs interface for the network connection, and
an Internet protocol (IP) address for a network device; and
where causing the traffic to be routed from the user device based on the at least one connection parameter comprises:
causing the traffic to be routed using the SGs interface, from the user device, to the network device.

14. The method of claim 11,
where the at least one connection parameter specifies:
a communication interface to be used with the network connection,
the communication interface comprising short data service (SDS) messages sent over a transmission control protocol (TCP) transport layer; and
where establishing the network connection for the user device based on the at least one connection parameter comprises:

causing the network connection to use the communication interface comprising SDS messages sent over the TCP transport layer.

15. The method of claim 11, further comprising:
receiving, from a location database, information indicating that traffic from the user device should be routed to a network device; and
where causing the traffic to be routed from the user device based on the at least one connection parameter, comprises:
causing the traffic to be routed, from the user device, to the network device.

16. The MME of claim 1, where the at least one connection parameter further specifies at least one of:
a type associated with the bearer,
the type including at least one of data, voice, default, or dedicated; or a characteristic associated with the bearer,
the characteristic including at least one of a data rate or a connection frequency.

17. The MME of claim 1, where the one or more processors of the MME, when causing the traffic to be routed, from the user device, based on the at least one connection parameter, are to:
cause the traffic to be routed from the user device through a serving gateway (SGW).

18. The non-transitory computer-readable medium of claim 6,
where the at least one connection parameter further specifies at least one of:
a type associated with the bearer,
the type including at least one of data, voice, default, or dedicated; or a characteristic associated with the bearer,
the characteristic including at least one of a data rate or a connection frequency.

19. The non-transitory computer-readable medium of claim 6,
where the at least one connection parameter specifies:
a communication interface to be used with the network connection,
the communication interface comprising short data service (SDS) messaging over an air interface; and
where the one or more instructions, that cause the one or more processors of the MME to establish the network connection for the user device based on the at least one connection parameter, cause the one or more processors of the MME to:
cause the network connection to use the communication interface comprising SDS messaging over the air interface.

20. The method of claim 11 where causing the traffic to be routed from the user device comprises:
causing the traffic to be routed from the user device through a serving gateway (SGW).

* * * * *